United States Patent
Li et al.

(10) Patent No.: US 8,619,480 B2
(45) Date of Patent: Dec. 31, 2013

(54) METHOD AND SYSTEM FOR MEMORY CONTROLLER CALIBRATION

(75) Inventors: Xiaoguang Li, Fort Lee, NJ (US); Gary Richard Burrell, Wyckoff, NJ (US)

(73) Assignee: Fujitsu Limited, Kawasaki-shi (JP)

( * ) Notice: Subject to any disclaimer, the term of this patent is extended or adjusted under 35 U.S.C. 154(b) by 567 days.

(21) Appl. No.: 12/914,398

(22) Filed: Oct. 28, 2010

(65) Prior Publication Data
US 2012/0110240 A1 May 3, 2012

(51) Int. Cl.
*G11C 7/00* (2006.01)

(52) U.S. Cl.
USPC ............... 365/194; 365/189.011; 365/189.15; 365/189.16; 365/189.17; 365/189.05; 365/189.08; 365/201; 365/233.1; 365/233.11; 365/233.5; 711/103; 711/E12.001; 711/E12.008

(58) Field of Classification Search
USPC ........... 365/189.011, 189.15, 189.16, 189.17, 365/189.05, 189.08, 194, 201, 233.1, 365/233.11, 233.5; 711/103, E12.001, 711/E12.008, 601
See application file for complete search history.

(56) References Cited

U.S. PATENT DOCUMENTS

| 7,808,849 B2 * | 10/2010 | Swain et al. ................. 365/201 |
| 7,975,164 B2 * | 7/2011 | Lee et al. ...................... 713/601 |
| 2009/0307521 A1 * | 12/2009 | Lee et al. ...................... 713/601 |
| 2010/0205386 A1 * | 8/2010 | Yamashita .................... 711/154 |
| 2011/0249522 A1 * | 10/2011 | Welker et al. ................. 365/194 |

* cited by examiner

*Primary Examiner* — Fernando Hidalgo
(74) *Attorney, Agent, or Firm* — Baker Botts L.L.P.

(57) ABSTRACT

A method for calibration of a memory controller may include determining if an unused memory location exists in memory. The method may include writing a first pattern to the unused memory location in response to a determination that the unused memory location exists. The method may include determining if a second pattern exists in the memory in response to a determination that the unused memory location does not exist. The method may include iteratively modifying a first delay of a first delay control module among a plurality of delay values. The method may include reading from a memory location including the first pattern or the second pattern for each iteration of modification of the first delay. The method may include modifying one or more second delays, each second delay associated with one of one or more second delay control modules, based on the results of reading from the memory location.

18 Claims, 3 Drawing Sheets

METHOD AND SYSTEM FOR MEMORY CONTROLLER CALIBRATION

TECHNICAL FIELD OF THE INVENTION

The present invention relates generally to computing devices and, more particularly, to a method and system for memory controller calibration.

BACKGROUND

Computing systems typically employ memory. A memory may include any system, device, or apparatus configured to retain program instructions and/or data for a period of time (e.g., computer-readable media). Memory may include random access memory (RAM), electrically erasable programmable read-only memory (EEPROM), a PCMCIA card, flash memory, magnetic storage, opto-magnetic storage, or any suitable selection and/or array of volatile or non-volatile memory.

As memory technology improves, memory devices execute at ever-increasing speeds. At such speeds, variability introduced by voltage and temperature variations in a memory may lead to undesired performance in a memory. FIG. 1 illustrates an example of such undesired performance. The left-hand side of FIG. 1 depicts various signal waveforms in a memory under "normal" operating conditions. A clock signal, indicated by "CLOCK" may be utilized as a periodic signal to latch data for storage in memory. For example, a memory may latch data for storage on a rising edge of a clock signal, indicated by an upward-pointing arrow in FIG. 1. Accordingly, it is desirable that at such rising edge of CLOCK, any data signal (e.g., D[0], D[1], . . . D[N−1]) to be latched is at either its high or low signal level (e.g., high voltage corresponding to logic 1, low voltage corresponding to logic 0) as shown in the left-hand side of FIG. 1, and not in transition between the two signal levels, as shown in the right-hand side of FIG. 1.

Existing approaches to account for voltage and temperature variations in memory have shortcomings. For example, one approach involves temporarily ceasing memory operation to perform a dynamic calibration to in order to realign data signals and clock signals. However, this approach may be undesirable as it requires a temporary cessation of memory operation. Another approach involves using the N-side of the differential clock input to monitor the phase shift change on data signals due to voltage and temperature variations. The N-side of the clock is often used to capture the falling edge data, but can be used for other purposes. This approach does not require cessation of memory operation, but has its own disadvantages.

SUMMARY

In accordance with a particular embodiment of the present disclosure, a method for calibration of a memory controller may include determining if an unused memory location exists in a memory. The method may also include writing a first pattern to the unused memory location in response to a determination that the unused memory location exists. The method may additionally include determining if a second pattern exists in the memory in response to a determination that the unused memory location does not exist. The method may further include iteratively modifying a first delay of a first delay control module among a plurality of delay values. Moreover, the method may include reading from a memory location including the first pattern or the second pattern for each iteration of modification of the first delay. The method may also include modifying one or more second delays, each second delay associated with one of one or more second delay control modules, based on the results of reading from the memory location.

Technical advantages of one or more embodiments of the present invention may provide for continuous dynamic memory calibration in addition to any initial calibration occurring at startup.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 2:
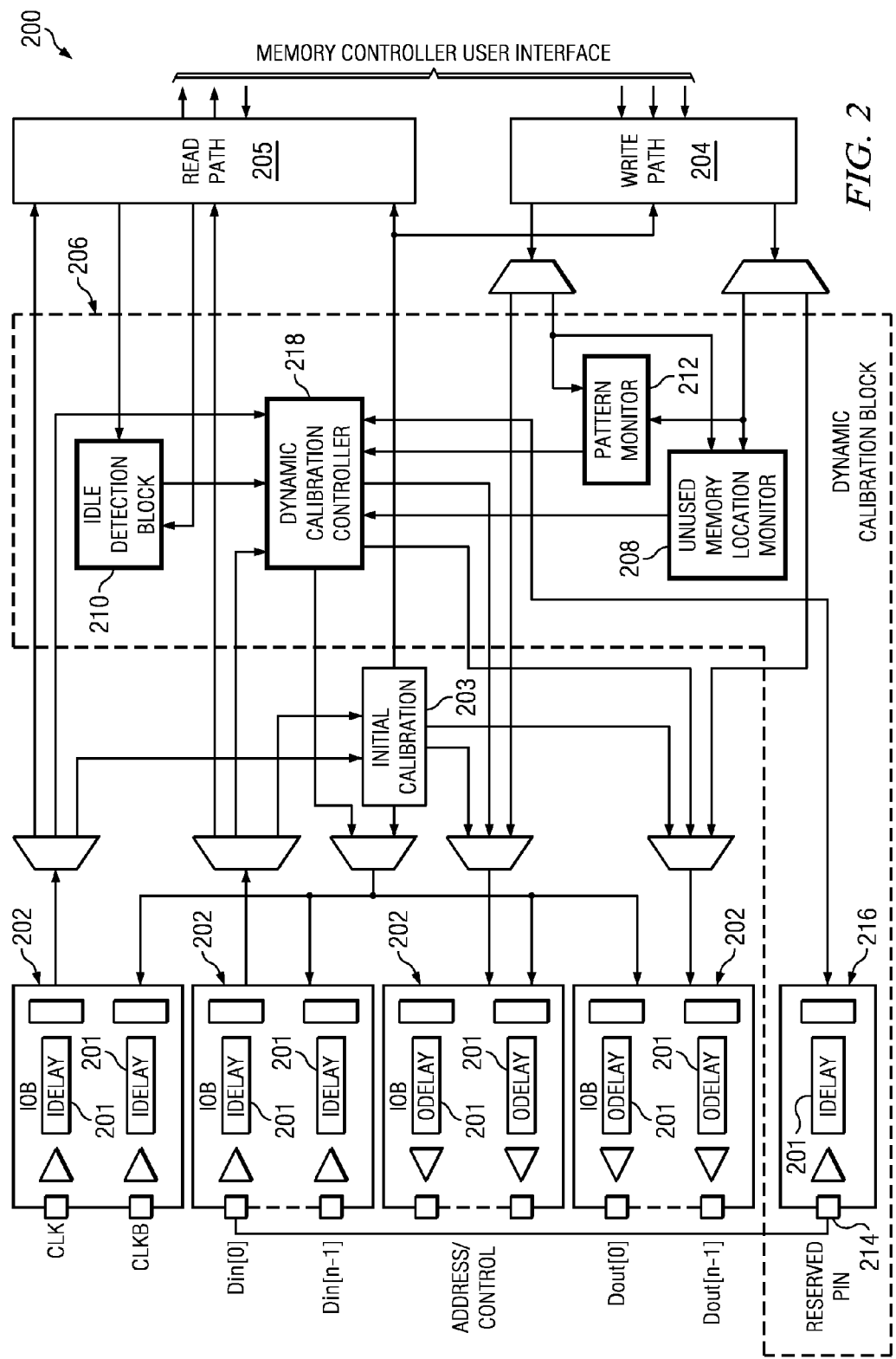
FIG. 2 depicts a block diagram of selected components of an example memory controller including dynamic calibration functionality, in accordance with embodiments of the present disclosure.

FIG. 2 depicts a block diagram of selected components of an example memory controller 200 including dynamic calibration functionality, in accordance with embodiments of the present disclosure. Memory controller 200 may be any system, device, or apparatus configured to manage and/or control a memory system having one or more memory devices. For example, memory controller 200 may be configured to read data from and/or write data to memory devices comprising a memory system. In some embodiments, memory controller 200 may comprise a field programmable gate array (FPGA)-based memory controller. As shown in FIG. 2, memory controller 200 may include input-output blocks (IOBs) 202, initial calibration block 203, write path 204, read path 205, and dynamic calibration block 206. Dynamic calibration block 206 may include unused memory location monitor 208, idle detection block 210, pattern monitor 212, reserved pin 214, IOB 216 associated with reserved pin 214, and dynamic calibration controller 218.

IOBs 202 and 216 may comprise input-output blocks configured to convert between internal memory controller 200 signals and memory device signals external to memory controller 200. An IOB 202, 216 may include buffers, delay control modules 201 configured to delay signals, serial-to-parallel converters, and/or any other suitable components.

Initial calibration block 203 may include any device, system, or apparatus configured to calibrate the delay of data signals relative to clock signals. At startup, initial calibration block 203 or another component of memory controller 200 may write a particular data pattern into a certain location of a memory associated with memory controller 200. Subsequently, initial calibration block 203 may apply numerous reads to the same memory location in order to detect the boundaries of the data capture window of the clock signal by iteratively adjusting delay control modules 201 for data and clock signals. As a result of this initial calibration, initial calibration block 203 detects the phase relationship of the latching clock edge and the data. Based on this detected relationship, initial calibration block 203 may adjust delay control modules in order to center align waveforms for data signals to the waveform for the clock.

Write path 204 may include suitable logic for converting user interface write commands to proper timing relationships in a memory device associated with memory controller 200 (e.g., double data rate or DDR signaling for DDR memory devices). Similarly, read path 205 may include suitable logic for converting user interface read commands to proper timing relationships in a memory device associated with memory controller 200 (e.g., DDR signaling for DDR memory devices) and/or capturing read data from memory devices and communicating a signal to the user that data response to the read command is available at the user interface.

Unused memory location monitor 208 may include any device, system, or apparatus configured to monitor usage of memory devices associated with memory controller 208 and report any unused memory locations.

Idle detection block 210 may include any device, system, or apparatus configured to detect if the next clock cycle is an idle memory cycle (e.g., no read or write request in the next cycle).

Pattern monitor 212 may include any device, system, or apparatus configured to monitor data written to a memory device associated with memory controller 200 as a result of write operations, and to track the memory locations of such data. If written data matches a particular pattern, pattern monitor 212 may report the memory location of the pattern to dynamic calibration controller 218.

Reserved pin 214 and its associated IOB 216 may be used in connection with the dynamic calibration procedure described in greater detail below. As is described below, in the dynamic calibration procedure, an adjustment may be made at delay control module 201 of IOB 216 so as to not interrupt normal memory access during calibration.

Dynamic calibration controller 218 may be any device, system, or apparatus configured to receive data from unused memory location monitor 208, idle detection block 210, pattern monitor 212, and/or IOB 216 and based on such data, perform a calibration procedure to adjust delay control modules 201 of IOBs 202. For example, as described in greater detail below, dynamic calibration controller 218 may determine when and where to write a test data pattern to an associated memory, when and where to read from the associated memory, and/or how to adjust delay control modules 201 for the clock signals and the data signals to approximately center align the data signals to the clock signals. Operation of dynamic calibration controller 218 and other components of dynamic calibration block 206 may be illustrated by FIG. 3.

Figure 3:
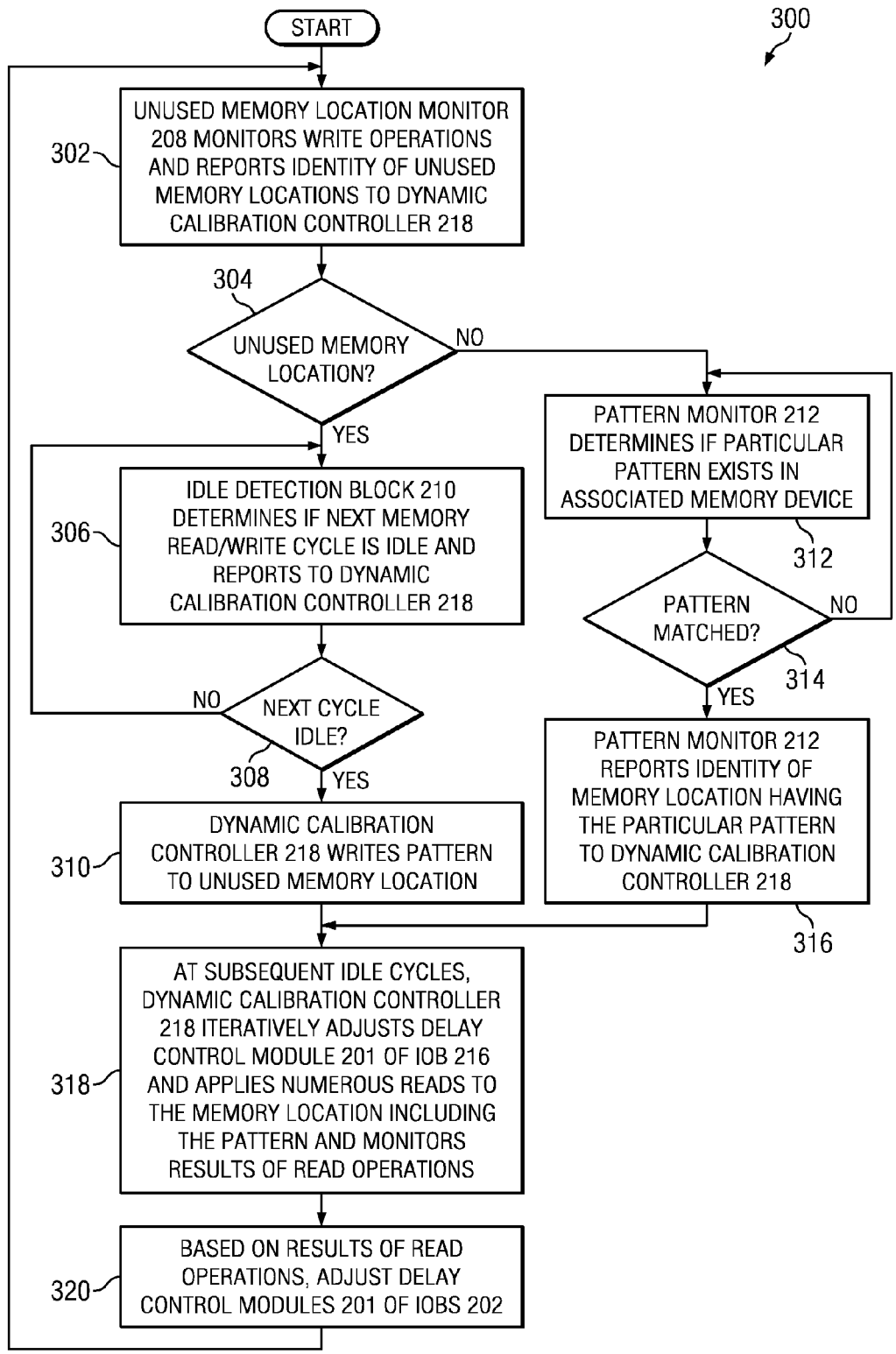
FIG. 3 depicts a flow chart of an example method for calibration in a memory controller, in accordance with embodiments of the present disclosure.

FIG. 3 depicts a flow chart of an example method 300 for calibration in a memory controller, in accordance with embodiments of the present disclosure. According to one embodiment, method 300 may begin at step 302. As noted above, teachings of the present disclosure may be implemented in a variety of configurations of memory controller 200. As such, the preferred initialization point for method 300 and the order of the steps 302-320 comprising method 300 may depend on the implementation chosen.

At step 302, a first stage of the dynamic calibration procedure may be entered in which unused memory location monitor 208 may monitor write operations and report to dynamic calibration controller 218 the identity of any unused locations of a memory associated with memory controller 200.

At step 304, dynamic calibration controller 218 may determine if unused memory locations exist (e.g., by determining if any unused memory locations are reported to it by unused memory location monitor 208). If unused memory locations exist, method 300 may proceed to step 306. Otherwise, if unused memory locations do not exist, method 300 may proceed to step 312 where a second stage of the calibration may begin.

At step 306, in response to a determination that unused memory locations exist, idle detection block 210 may determine if the next read/write memory cycle is idle and reports such determination to dynamic calibration controller 218.

At step 308, dynamic calibration controller 218 may determine if the next memory read/write cycle is idle (e.g., based on information reported to it by idle detection block 210). If the next cycle is idle, method 300 may proceed to step 310. Otherwise, if the next cycle is not idle, method 300 may proceed again to step 306.

At step 310, dynamic calibration controller 218 may write a particular pattern to an unused memory location during the idle memory cycle. After completion of step 310, method 300 may proceed to step 320.

At step 312, in response to a determination (at step 304) that unused memory locations do not exist, pattern monitor 212 may monitor writes to a memory device associated with memory controller 200 to determine if a particular pattern exists in memory.

At step 314, if the particular pattern is matched, method 300 may proceed to step 314. Otherwise, if the particular pattern is not matched, method 300 may proceed again to step 312.

At step 316, pattern monitor 212 may report to dynamic calibration controller the identity of the memory location having the particular pattern. After completion of step 316, method 300 may proceed to step 318.

At step 318, dynamic calibration controller 218 may, at subsequent memory read/write idle cycles (e.g., as detected by idle detection block 210), iteratively adjust delay control module 201 of IOB 216, apply numerous reads to the memory location including the particular pattern, and monitor the results of the read operations. By determining which read operations return the particular pattern, dynamic calibration controller 218 may detect the boundaries of the data capture window of the clock signal and thus, may detect the phase relationship of the latching clock edge and the data.

At step 320, dynamic calibration controller 218 may adjust the delays of delay control modules 201 of IOBs 202 based on the monitored results of the read operations. For example, dynamic calibration controller 218 may adjust the delays of delay control modules 201 of IOBs 202 such that waveforms for data signals may be approximately center aligned to the waveform for the clock signal. After completion of step 320, method 300 may proceed again to step 302.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order. In addition, the steps comprising method 300 may be repeated, independently and/or collectively, as often as desired or required by a chosen implementation.

Method 300 may be implemented using memory controller 200 or any other system operable to implement method 300. In certain embodiments, method 300 may be implemented partially or fully in software and/or firmware embodied in computer-readable media.

Figure 1:
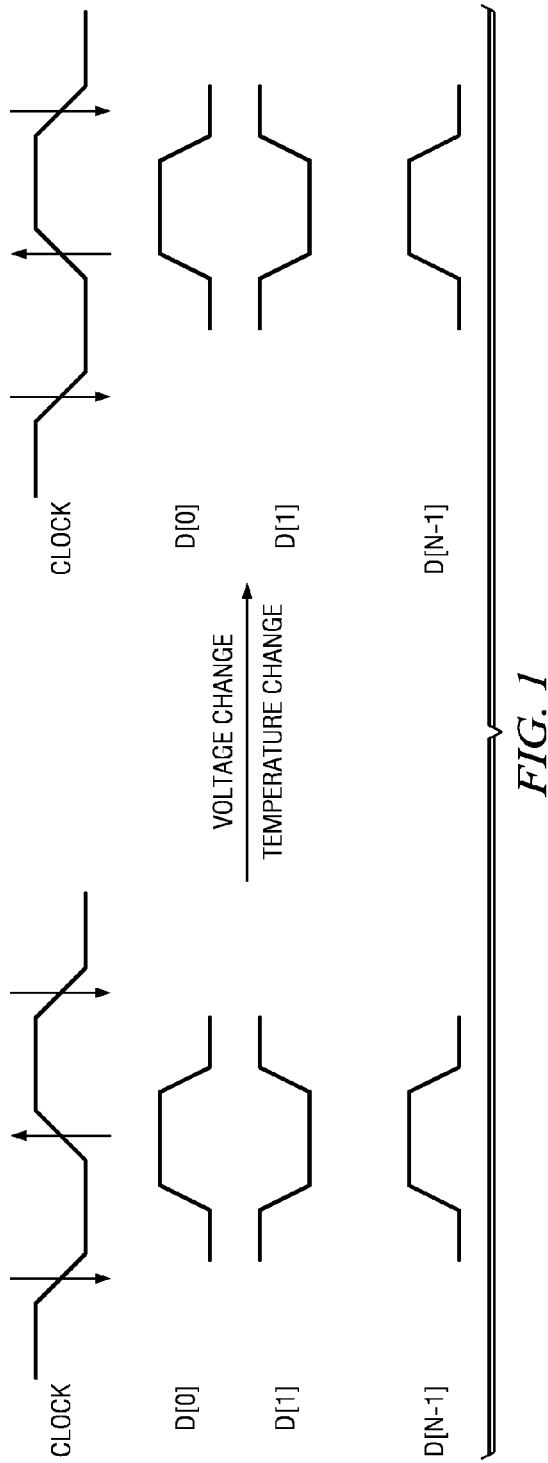
FIG. 1 depicts two graphs of signal amplitudes versus time for various signals in a memory controller, illustrating variances in such signal waveforms due to changes in temperature, voltage, or other conditions, in accordance with embodiments of the present disclosure.
Figure 4:
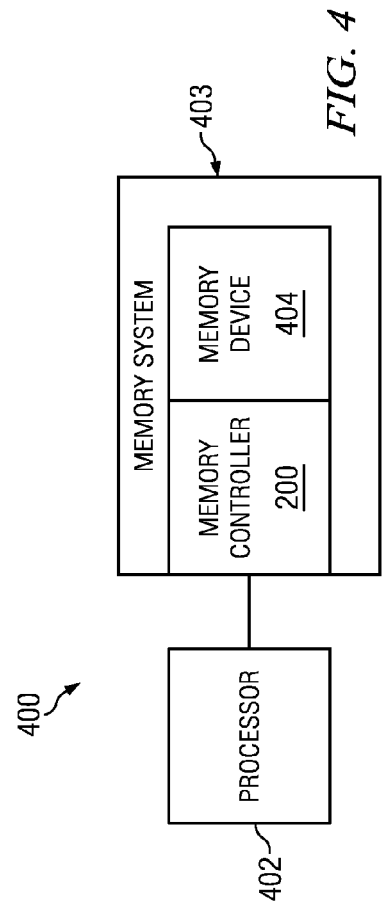
FIG. 4 depicts a block diagram of selected components of an example computing system, in accordance with embodiments of the present disclosure.

FIG. 4 depicts a block diagram of selected components of an example computing system 400, in accordance with embodiments of the present disclosure. In some embodiments, computing system 400 may comprise a server or servers (e.g., mounted in a server chassis holding one or more server blades). In other embodiments, computing system 400 may comprise a storage enclosure. In yet other embodiments, computing system 400 may be a personal computer (e.g., a desktop computer or a portable computer). As shown in FIG. 4, computing system 400 may include a processor 402 and a memory system 403.

Processor 402 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 402 may interpret and/or execute program instructions and/or process data stored in memory 404 and/or another component of computing system 400. Although FIG. 4 depicts computing system 400 as including one processor 402, computing system 400 may include any suitable number of processors 402.

Memory system 403 may include memory controller 200 and one or more memory devices 404 communicatively coupled to memory controller 200. Although memory controller 200 is shown in FIG. 4 as an integral component of memory system 403, memory controller 200 may be separate from memory system 200 and/or may be an integral portion of another component of computing system 400 (e.g., memory controller 200 may be integrated into processor 402).

Memory device 404 may include any system, device or apparatus configured to retain program instructions and/or data for a period of time (e.g., computer-readable media). Memory device 404 may include a dynamic random access memory (DRAM) module (e.g, a dual in-line package (DIP) memory, a Single In-line Pin Package (SIPP) memory, a Single Inline Memory Module (SIMM), a Ball Grid Array (BGA)), or any other suitable memory. Although FIG. 4 depicts memory system 403 as including one memory device 404, memory system 403 may include any suitable number of memory devices 404.

A component of memory controller 200 and/or computing system 400 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

Modifications, additions, or omissions may be made to memory controller 200 and/or computing system 400 without departing from the scope of the invention. The components of memory controller 200 and/or computing system 400 may be integrated or separated. Moreover, the operations of optical memory controller 200 and/or computing system 400 may be performed by more, fewer, or other components. Additionally, operations of memory controller may be performed using any suitable logic. As used in this document, "each" refers to each member of a set or each member of a subset of a set.

Although the present invention has been described with several embodiments, various changes and modifications may be suggested to one skilled in the art. It is intended that the present invention encompass such changes and modifications as fall within the scope of the appended claims.

What is claimed is:

1. A method for calibration of a memory controller, comprising:
    determining if an unused memory location exists in a memory;
    in response to a determination that the unused memory location exists, writing a first pattern to the unused memory location;
    in response to a determination that the unused memory location does not exist, determining if a second pattern exists in the memory;
    iteratively modifying a first delay of a first delay control module among a plurality of delay values, the first delay control module configured to delay a clock or data signal by the first delay;
    for each iteration of modification of the first delay, reading from a memory location including the first pattern or the second pattern; and
    based on the results of reading from the memory location, modifying one or more second delays, each second delay associated with one of one or more second delay control modules, the one or more second delay control modules each configured to delay the clock or data signal by the one or more second delays.

2. A method according to claim 1, wherein the first pattern is substantially identical to the second pattern.

3. A method according to claim 1, wherein writing the first pattern to the unused memory location occurs during an idle memory cycle.

4. A method according to claim 1, wherein reading from the memory location including the first pattern or the second pattern occurs during an idle memory cycle.

5. A method according to claim 1, wherein modifying the one or more second delays comprises modifying the one or more second delays such that waveforms for data signals may be approximately center aligned to a waveform for a clock signal.

6. A method according to claim 1, wherein:
    the one or more second delay control modules are associated with input/output blocks for data signals and clock signals used for normal memory operations; and
    the first delay control module is associated with a reserved input/output block used for reading the first pattern or the second pattern.

7. A memory controller comprising:
    one or more first input/output blocks used for normal memory operations, each of the first input/output blocks including a first delay control module having a first delay for delaying a clock or data signal;
    an unused memory location monitor configured to monitor usage of one or more memory devices associated with the memory controller and report identities of unused memory locations;

a pattern monitor configured to:
monitor data written to the one or more memory devices as a result of write operations; and
if data written to the one or more memory devices matches a first pattern, report the memory location of the first pattern; and
a second input/output block including a second delay control module having a second delay;
a dynamic calibration controller communicatively coupled to the unused memory location monitor and the pattern monitor and configured to:
if the unused memory location reports the identity of an unused memory location, write a second pattern to the unused memory location;
if the unused memory location reports no unused memory locations exist, determine if the first pattern exists in memory;
iteratively modify the second delay among a plurality of delay values;
for each iteration of modification of the second delay, read from a memory location including the first pattern or the second pattern via the second input/output block; and
based on the results of reading from the memory location, modifying the first delay of the first delay control module of each of the first input/output blocks.

8. A memory controller according to claim 7, wherein the first pattern is substantially identical to the second pattern.

9. A memory controller according to claim 7, further comprising:
an idle detection block communicatively coupled to the dynamic calibration controller and configured to detect if a subsequent clock cycle is an idle memory cycle and report to the dynamic calibration controller that the subsequent cycle is an idle memory cycle; and
the dynamic calibration controller configured to write the second pattern to the unused memory during the idle memory cycle.

10. A memory controller according to claim 7, further comprising:
an idle detection block communicatively coupled to the dynamic calibration controller and configured to detect if a subsequent clock cycle is an idle memory cycle and report to the dynamic calibration controller that the subsequent cycle is an idle memory cycle; and
the dynamic calibration controller configured to read from the memory location including the first pattern or the second pattern during an idle memory cycle.

11. A memory controller according to claim 7, the dynamic calibration controller configured to modify the one or more second delays such that waveforms for data signals may be approximately center aligned to a waveform for a clock signal.

12. A memory controller according to claim 7, wherein the memory controller is a field programmable gate array-based memory controller.

13. A computing device comprising:
a processor;
a memory system communicatively coupled to the processor, the memory system comprising:
one or more memory devices configured to retain program instructions or data for a period of time; and
a memory controller communicatively coupled to the one or more memory devices, the memory controller comprising:
one or more first input/output blocks used for normal memory operations, each of the first input/output blocks including a first delay control module having a first delay for delaying a clock or data signal;
an unused memory location monitor configured to monitor usage of the one or more memory devices and report identities of unused memory locations;
a pattern monitor configured to:
monitor data written to the one or more memory devices as a result of write operations; and
if data written to the one or more memory devices matches a first pattern, report the memory location of the first pattern; and
a second input/output block including a second delay control module having a second delay;
a dynamic calibration controller communicatively coupled to the unused memory location monitor and the pattern monitor and configured to:
if the unused memory location reports the identity of an unused memory location, write a second pattern to the unused memory location;
if the unused memory location reports no unused memory locations exist, determine if the first pattern exists in memory;
iteratively modify the second delay among a plurality of delay values;
for each iteration of modification of the second delay, read from a memory location including the first pattern or the second pattern via the second input/output block; and
based on the results of reading from the memory location, modifying the first delay of the first delay control module of each of the first input/output blocks.

14. A computing device according to claim 13, wherein the first pattern is substantially identical to the second pattern.

15. A computing device according to claim 13, the memory controller further comprising:
an idle detection block communicatively coupled to the dynamic calibration controller and configured to detect if a subsequent clock cycle is an idle memory cycle and report to the dynamic calibration controller that the subsequent cycle is an idle memory cycle; and
the dynamic calibration controller configured to write the second pattern to the unused memory during the idle memory cycle.

16. A computing device according to claim 13, the memory controller further comprising:
an idle detection block communicatively coupled to the dynamic calibration controller and configured to detect if a subsequent clock cycle is an idle memory cycle and report to the dynamic calibration controller that the subsequent cycle is an idle memory cycle; and
the dynamic calibration controller configured to read from the memory location including the first pattern or the second pattern during an idle memory cycle.

17. A computing device to claim 13, the dynamic calibration controller configured to modify the one or more second delays such that waveforms for data signals may be approximately center aligned to a waveform for a clock signal.

18. A computing device according to claim 13, wherein the memory controller comprises a field programmable gate array-based memory controller.

* * * * *